(12) United States Patent
Jang et al.

(10) Patent No.: US 10,809,419 B2
(45) Date of Patent: Oct. 20, 2020

(54) ANTIREFLECTION FILM FOR A DISPLAY DEVICE

(71) Applicant: LG CHEM, LTD., Seoul (KR)

(72) Inventors: Seok Hoon Jang, Daejeon (KR); Heon Kim, Daejeon (KR); Boo Kyung Kim, Daejeon (KR); Jin Seok Byun, Daejeon (KR); Yeong Rae Chang, Daejeon (KR)

(73) Assignee: LG CHEM., LTD., Seoul (KR)

( * ) Notice: Subject to any disclaimer, the term of this patent is extended or adjusted under 35 U.S.C. 154(b) by 108 days.

(21) Appl. No.: 15/741,465

(22) PCT Filed: Dec. 5, 2016

(86) PCT No.: PCT/KR2016/014182
§ 371 (c)(1),
(2) Date: Jan. 2, 2018

(87) PCT Pub. No.: WO2017/095206
PCT Pub. Date: Jun. 8, 2017

(65) Prior Publication Data
US 2018/0364396 A1 Dec. 20, 2018

(30) Foreign Application Priority Data

Dec. 3, 2015 (KR) .................. 10-2015-0171773
Dec. 2, 2016 (KR) .................. 10-2016-0163711

(51) Int. Cl.
*G02B 1/14* (2015.01)
*G02B 1/111* (2015.01)
*G02B 1/16* (2015.01)
*C09D 7/61* (2018.01)
*C09D 5/00* (2006.01)
*C09D 7/40* (2018.01)
(Continued)

(52) U.S. Cl.
CPC .............. *G02B 1/111* (2013.01); *C09D 5/006* (2013.01); *C09D 7/61* (2018.01); *C09D 7/67* (2018.01); *G02B 1/14* (2015.01); *G02B 1/16* (2015.01); *C08K 3/36* (2013.01); *G02F 1/133502* (2013.01)

(58) Field of Classification Search
CPC .. G02B 1/111; G02B 1/14; G02B 1/16; C09D 7/61; C09D 7/67; C09D 5/006; C08K 3/36; G02F 1/133502
See application file for complete search history.

(56) References Cited

U.S. PATENT DOCUMENTS

| 7,695,781 B2 | 4/2010 | Yoneyama et al. |
| 9,046,645 B2 * | 6/2015 | Hayashi ................ G02F 1/1335 |
| 2006/0152801 A1 | 7/2006 | Matsunaga |

(Continued)

FOREIGN PATENT DOCUMENTS

| CN | 101107542 A | 1/2008 |
| CN | 101128753 A | 2/2008 |

(Continued)

*Primary Examiner* — Michelle M Iacoletti
*Assistant Examiner* — Magda Cruz
(74) *Attorney, Agent, or Firm* — Dentons US LLP

(57) ABSTRACT

The present invention relates to an antireflection film including: a hard coating layer in which center line average roughness (Ra) of the surface is 1.2 nm or less and surface energy is 34 mN/m or less; and a low refractive index layer which is formed on the hard coating layer.

17 Claims, 1 Drawing Sheet

(51) Int. Cl.
*C08K 3/36* (2006.01)
*G02F 1/1335* (2006.01)

(56) References Cited

U.S. PATENT DOCUMENTS

| | | | |
|---|---|---|---|
| 2006/0188664 A1* | 8/2006 | Ando | G02F 1/133502 |
| | | | 428/1.1 |
| 2008/0137206 A1 | 6/2008 | Nakamura et al. | |
| 2008/0158675 A1 | 7/2008 | Fukushige et al. | |
| 2009/0142561 A1* | 6/2009 | Zhang | C08J 7/042 |
| | | | 428/212 |
| 2009/0202802 A1 | 8/2009 | Seong et al. | |
| 2010/0021694 A1 | 1/2010 | Wakizaka et al. | |
| 2011/0195239 A1* | 8/2011 | Takane | C09D 7/61 |
| | | | 428/206 |
| 2012/0270021 A1* | 10/2012 | Akutagawa | G02B 1/111 |
| | | | 428/216 |
| 2014/0022639 A1* | 1/2014 | Yabuhara | G02B 1/116 |
| | | | 359/488.01 |
| 2014/0093741 A1 | 4/2014 | Fukuda et al. | |
| 2015/0152279 A1* | 6/2015 | Kai | C08J 7/0423 |
| | | | 428/216 |

FOREIGN PATENT DOCUMENTS

| | | | | |
|---|---|---|---|---|
| CN | 103460078 A | 12/2013 | | |
| EP | 2693237 A1 | 2/2014 | | |
| JP | 8-7363 A | 1/1996 | | |
| JP | 2004029705 A | 1/2004 | | |
| JP | 2005-17707 A | 1/2005 | | |
| JP | 2005-266800 A | 9/2005 | | |
| JP | 2006-58728 A | 3/2006 | | |
| JP | 2006063147 A | 3/2006 | | |
| JP | 2006-181731 A | 7/2006 | | |
| JP | 2007-69471 A | 3/2007 | | |
| JP | 2007177192 A | 7/2007 | | |
| JP | 2007293325 A | 11/2007 | | |
| JP | 2007321143 A | 12/2007 | | |
| JP | 2008242314 A | * 10/2008 | | G02B 1/11 |
| JP | 2009042351 A | 2/2009 | | |
| JP | 2009204833 A | 9/2009 | | |
| JP | 2010512423 A | 4/2010 | | |
| JP | 2010-156982 A | 7/2010 | | |
| JP | 2011-164457 A | 8/2011 | | |
| JP | 2011-215424 A | 10/2011 | | |
| JP | 2012-8159 A | 1/2012 | | |
| JP | 2012-133079 A | 7/2012 | | |
| JP | 2013-228741 A | 11/2013 | | |
| JP | 2014095890 A | 5/2014 | | |
| JP | 2015-4937 A | 1/2015 | | |
| KR | 10-2005-0065345 A | 6/2005 | | |
| KR | 10-2007-0112140 A | 11/2007 | | |
| KR | 10-2008-0033550 A | 4/2008 | | |
| KR | 10-2009-0119968 A | 11/2009 | | |
| KR | 10-2010-0074024 A | 7/2010 | | |
| KR | 10-2010-0112740 A | 10/2010 | | |
| KR | 10-2011-0114506 A | 10/2011 | | |
| KR | 10-2014-0037080 A | 3/2014 | | |
| KR | 10-2014-0084613 A | 7/2014 | | |
| KR | 10-2014-0140139 A | 12/2014 | | |

\* cited by examiner

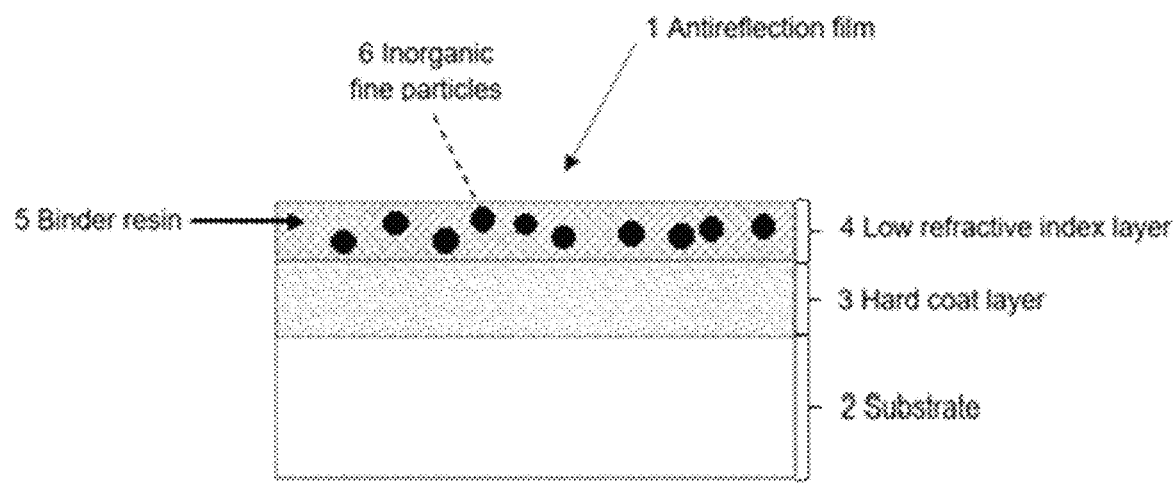

ANTIREFLECTION FILM FOR A DISPLAY DEVICE

CROSS-REFERENCE TO RELATED APPLICATION(S)

This application is a National Stage Application of International Application No. PC T/KR2016/014182 filed on Dec. 5, 2016, which claims the benefit of Korean Patent Application No. 10-2015-0171773 filed on Dec. 3, 2015 and Korean Patent Application No. 10-2016-0163711 filed 10 on Dec. 2, 2016, all of which are hereby incorporated by reference in their entirety for all purposes as is fully set forth herein.

TECHNICAL FIELD

The present invention relates to an antireflection film. More specifically, the present invention relates to an antireflection film capable of simultaneously implementing high scratch resistance and antifouling property while having low reflectivity and high light transmittance, and capable of reducing reflection of external light through implementation of low reflectivity and thus enhancing visibility of a display device.

BACKGROUND ART

In general, a flat panel display device such as a PDP or a LCD is equipped with an antireflection film for minimizing the reflection of light incident from the outside.

For minimizing the reflection of light, a method in which a filler such as inorganic fine particles is dispersed in a resin and coated onto a substrate film to impart irregularities (anti-glare: AG coating), a method of using interference of light by forming a plurality of layers having different refractive indexes on a substrate film (anti-reflection: AR coating), a method for mixing them, etc., exist.

Among them, in the case of the AG coating, an absolute amount of reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have recently been conducted.

As for a film using the AR coating, a multi-layer structure in which a hard coating layer (high refractive index layer), a low reflective coating layer, and the like are laminated on a substrate film has been commercialized. However, the method of forming a plurality of layers as described above has disadvantages in that, as the process for forming each layer is performed separately, interdayer adhesion force (interfacial adhesion) is weak and scratch resistance is low.

In addition, conventionally, in order to improve the scratch resistance of the low refractive index layer included in the antireflection film, a method of adding various particles of a nanometer size (for example, particles of silica, alumina, zeolite, etc.) has been mainly attempted. However, when the nanometer-sized particles were used as described above, there was a limitation in increasing the scratch resistance by significantly increasing the content of the nanometer-sized particles relative to the binder resin of the refractive index layer, and the antifouling property of the surface of the low refractive index layer was greatly reduced.

Accordingly, many studies have been actively conducted to reduce the absolute reflection amount of light incident from the outside and to improve scratch resistance of the surface as well as to improve the antifouling property.

DISCLOSURE

Description of Drawings

FIG. 1 is a schematic cross-sectional view showing a structure of an antireflection film according to one embodiment of the present invention.

REFERENCE NUMERALS

1: Antireflection film,
2: Substrate,
3: Hard coating layer,
2
4: Low refractive index layer,
5: Binder resin, and
6: Inorganic fine particles.

TECHNICAL PROBLEM

It is one object of the present invention to provide an antireflection film capable of simultaneously implementing high scratch resistance and antifouling property while having a low reflective index and high light transmittance, and capable of reducing the reflection of external light through implementation of low reflectivity and thus enhancing the visibility of a display device.

Technical Solution

In one embodiment of the present disclosure, an antireflection film (1) including a hard coating layer (3) in which center line average roughness (Ra) of the surface is 1.2 nm or less and surface energy is 34 mN/m or less, and a low refractive index layer (4) which is formed on the hard coating layer (3), is provided.

Hereinafter, the antireflection film (1) according to specific embodiments of the present invention will be described in more detail.

In the present disclosure, "photopolymerizable compound" collectively refers to a compound which causes a polymerization reaction when irradiated with light, for example, when irradiated with visible light or ultraviolet light.

Further, "fluorine-containing compound" refers to a compound containing at least one fluorine element in the compound.

In addition, "(meth)acryl" refers to both acryl and methacryl.

Furthermore, "(co)polymer" refers to both a co-polymer and a homo-polymer.

Moreover, "hollow silica particles" refers to silica particles derived from a silicon compound or an organosilicon compound, in which voids are present on the surface and/or inside of the silica particles.

According to one embodiment of the present invention, an antireflection film (1) including a hard coating layer (3) in which center line average roughness (Ra) of the surface is 1.2 nm or less and surface energy is 34 mN/m or less, and a low refractive index layer (4) which is formed on the hard coating layer (3), may be provided.

Conventionally, in order to further reduce the reflective index of the antireflection film (1), fine inorganic particles were added in an excessive amount, but as a result, there was a limit in that the scratch resistance and antifouling property of the surface of the low reflective index layer (4) were greatly reduced. The optical characteristics and mechanical properties of the antireflection film (1) are mainly determined depending on the low refraction layer, and thus previous studies have focused on a method of changing the main characteristics of the low refractive index layer (4) or of using a new additive.

However, the present inventors conducted intensive studies on the antirefection film (1) and found through experiments that, when the hard coating layer (3) of the antireflection film (1) has surface characteristics that were previously unknown, the antireflection film (1) enables the Improvement of the antifouling property together with mechanical properties such as optical characteristics, or scratch resistance, thereby completing the present invention.

Specifically, as proposed with respect to the antireflective film of the above-described embodiment, when a hard coating layer (3) having centerline average surface roughness (Ra) of 1.2 nm or less and surface energy of 34 mN/m or less is applied to the antireflection film (1), the surface characteristics of the entire antireflection film (1) can be adjusted, and such an antireflection film (1) can simultaneously implement high scratch resistance and antifouling property while having low reflective index and high light transmittance, and reduce the reflection of external light through implementation of low reflectivity, thus enhancing the visibility of a display device.

The surface of the hard coating layer (3) may have center line average roughness (Ra) of 1.2 nm or less, or 0.4 nm to 1.0 nm, or 0.5 nm to 0.8 nm. The center line average roughness may be a measured value indicating the surface roughness of the JIS standard (JIS B 0601-1982). For example, the measurement can be carried out by using aluminum-coated silicon tips (Bruker Corp.) at a scan speed of 0.5 to 0.8 Hz with Multimode AFM (MultiMode 8) equipment (Bruker Corp.). Specifically, each sample (length*width: 1 cm*1 cm) was fixed on an AFM sample disk with carbon tape, the measurement was carried out while observing a flat portion with an optical microscope, and 3-point measured values in the area of 5 μm*5 μm were averaged, thereby obtaining the center line average roughness (Ra).

Further, the hard coating layer (3) may have surface energy of 34 mN/m or less, or 28 mN/m to 34 mN/m, or 30 mN/m to 33.5 mN/m. The above-mentioned surface energy is measured by determining a contact angle of DI water (Gebhardt) and diiodomethane (Owens) at 10 points using a commonly known measuring device, for example, a contact angle measuring apparatus DSA-100 (Kruss), calculating an average value, and then converting the average contact angle into the surface energy. Specifically, in the measurement of the surface energy, the contact angle can be converted into the surface energy by using Dropshape Analysis software and applying the following General Formula 1 of the OWRK (Owen, Wendt, Rable, Kaelble) method to the program.

$$\gamma_L(1+\cos\theta) = 2\sqrt{\gamma_S^D \gamma_L^D} + 2\sqrt{\gamma_S^P \gamma_L^P} \quad \text{[General Formula 1]}$$

As the hard coating layer (3) has the center line average roughness and the surface energy described above, the antireflection film (1) including the above hard coating layer (3) can simultaneously achieve high scratch resistance and antifouling property while having low reflectivity and high light transmittance.

As the center line average roughness and the surface energy are limited to the above-mentioned range, the surface roughness of the antirefection film (1) including the hard coating layer (3) and the low refractive index layer (4) can be relatively lowered. As a result, the surface slip property of the antireflection (1) film is improved and friction can be reduced. In addition, the surface roughness and the surface energy of the antireflection film (1) may be reduced, which makes it difficult for the surface to adsorb a contaminant by a capillary phenomenon, thereby facilitating surface cleaning and ensuring an improved antifouling property.

The center line average roughness and the surface energy of the hard coating layer (3) can be obtained by adjusting the surface characteristics of the hard coating layer. For example, by adjusting the curing degree in the surface of the hard coating layer, the surface of the hard coating layer may have center line average roughness (Ra) of 1.2 mm or less, or 0.5 to 1.0 mm, and the hard coating layer may have surface energy of 34 mN/m or less, or 28 mN/m to 34 mN/m, or 30 mN/m to 33.5 mN/m.

Specifically, the curing degree of the hard coating layer (3) can be controlled by adjusting curing conditions such as a light irradiation amount or intensity or a flow rate of injected nitrogen in the process of forming the hard coating layer, and it is possible to obtain a hard coat layer which is surface-cured to about 30% to 48%. In the case of a hard coating layer which is substantially completely cured, it may be difficult to have sufficient scratch resistance, but as described above, the hard coating layer surface-cured to about 30% to 48% can have high scratch resistance and antifouling property at the same time.

Thus, the hard coating layer surface-cured to about 30% to 48% may have center line average roughness (Ra) of 1.2 nm or less, or 0.5 nm to 1.0 nm at the surface, and surface energy of 34 mN/m or less, or 28 mN/m to 34 mN/m, or 30 mN/m to 33.5 mN/m.

For example, the hard coating layer (3) can be obtained by subjecting the resin composition for forming the hard coating layer to ultraviolet irradiation at a dose of 5 to 2000 mJ/cm$^2$, or 10 to 200 mJ/W under nitrogen purging in order to apply the nitrogen atmosphere condition. Further, in a state where the resin composition for forming the hard coating layer is coated on the substrate (2), the ultraviolet irradiation can also be performed while moving at a speed of 10 m/min to 100 m/min.

Meanwhile, as the hard coating layer (3), one commonly known in the art can be used without particular limitation.

One example of the hard coating film includes a hard coating film including a binder resin (5) containing a photocurable resin.

The photocurable resin contained in the hard coating layer (3) may be a polymer of a photocurable compound capable of causing a polymerization reaction when irradiated with light, such as an ultraviolet light or the like, and may be one that is conventionally used in the relevant art.

For example, the hard coating layer (3) may include a binder resin (5) containing a polymer of at least one photocurable compound selected from the group consisting of (meth)acrylate monomers having at least one ethylenically unsaturated bond; monomers or oligomers of urethane-based (meth)acrylate monomers having at least one ethylenically unsaturated bond, an epoxy-based (meth)acrylate having at least one ethylenically unsaturated bond, and an ester-based (meth)acrylate having at least one ethylenically unsaturated bond; and (meth)acrylate compounds having at least one ethylenically unsaturated bond and having a heterocyclic skeleton or (meth)acrylates having at least one ethylenically unsaturated bonds and having an alicyclic ring.

Further, the photocurable compound may be a polyfunctional (meth)acrylate-based monomer or oligomer. In this case, it is advantageous for the number of (meth)acrylate-based functional groups to be 2 to 10, preferably 2 to 8, more preferably 2 to 7 in terms of securing the physical properties of the hard coating layer (3).

Such a polyfunctional (meth)acrylate monomer is a (meth)acrylate monomer having at least one or at least two functional groups having an ethylenically unsaturated bond such as a vinyl group or a (meth)acrylate group in the molecule, and more specific examples thereof include bifunctional (meth)acrylates such as ethylene glycol di(meth)acrylate, propylene glycol di(meth)acrylate, pentaerythritol di(meth)acrylate monostearate, dicyclopentanyl di(meth)acrylate, and isocyanurate di(meth)acrylate; trifunctional (meth)acrylates such as trimethylolpropane tri(meth)acrylate, pentaerythritol tri(meth)acrylate, and tris(acryloxyethyl)isocyanurate; tetrafunctional or higher (meth)acrylates such as pentaerythritol tetra(meth)acrylate, dipentaerythritol tetra(meth)acrylate, dipentaerythritol penta(meth)acrylate, and dipentaerythritol hexa(meth)acrylate; and ethylene oxide-modified products, caprolactone-modified products, and propionic acid-modified products of the above-mentioned polyfunctional(meth)acrylatemonomers.

In addition, the photocurable compound may include at least one monomer or oligomer such as a urethane-based (meth)acrylate, an epoxy-based (meth)acrylate, or an ester-based (meth)acrylate.

Further, the photocurable compound may be a (meth)acrylate compound having a heterocyclic skeleton or a (meth)acrylate having an alicyclic ring.

As the above heterocyclic skeleton, specific skeletons that can be used include a dioxane skeleton, a trioxane skeleton, an isocyanurate skeleton, and the like. The (meth)acryloyl group may be linked to the heterocyclic skeleton. Specifically, the (meth)acryloyl group is preferably connected to the heterocyclic skeleton directly or via a hydrocarbon group. When the (meth)acryloyl group is linked through a hydrocarbon group, the hydrocarbon group may include an alkylene group having 1 to 10 carbon atoms or an alkylene group having 1 to 10 carbon atoms and having an ether bond.

Specific examples of the (meth)acrylate having an alicyclic ring include, as monofunctional (meth)acrylate compounds, monofunctional (meth)acrylate having an alicyclic ring such as isobornyl (meth)acrylate, dicyclopentanyl (meth)acrylate, dicyclopentenyl (meth)acrylate, dicyclopentenyloxyethyl (meth)acrylate, cyclohexyl (meth)acrylate, 1,3-damantanediol di(meth)acrylate, 1,3-adamantane dimethanol di(meth)acrylate, 2-methyl-2-adamantyl (meth)acrylate, 2-ethyl-2-adamantyl (meth)acrylate, 3-hydroxy-1-adamantyl(meth)acrylate, and 1-adamantyl (meth)acrylate; or difunctional (meth)acrylate having an alicyclic ring such as tricyclodecanedimethanol (meth)acrylate.

As another example of the hard coating film, one including a binder resin containing a photocurable resin and a high molecular weight (co)polymer having a weight average molecular weight of 10,000 or higher, and organic or inorganic fine particles dispersed in the binder resin, may be mentioned.

The high molecular weight (co)polymer may be at least one selected from the group consisting of cellulose-based polymers, acryl-based polymers, styrene-based polymers, epoxide-based polymers, nylon-based polymers, urethane-based polymers, and polyolefin-based polymers.

The photocurable resin contained in the hard coating layer may be a polymer of a photocurable compound capable of causing a polymerization reaction when irradiated with light such as ultraviolet light or the like, and may be one that is conventionally used in the relevant art. Specific examples of the photocurable compound are as described above.

The organic or inorganic fine particles may have a particle diameter of 1 μm to 10 μm.

The organic or inorganic fine particles may be organic fine particles consisting of an acryl-based resin, a styrene-based resin, an epoxide resin, and a nylon resin, or may be inorganic fine particles consisting of silicon oxide, titanium dioxide, indium oxide, tin oxide, zirconium oxide, and zinc oxide.

The hard coating film may be formed from an antiglare coating composition including organic or inorganic fine particles, a photocurable resin, a photoinitiator, and a high molecular weight (co)polymer having a weight average molecular weight of 10,000 or more.

As another example of the hard coating film, one including a binder resin containing a photocurable resin, and an antistatic agent dispersed in the binder resin, may be mentioned.

As described above, the photocurable resin included in the hard coating layer (3) is a polymer of a photocurable compound which can cause a polymerization reaction when irradiated with light such as ultraviolet rays, and may be one that is conventionally used in the relevant art. Specific examples of the photocurable compound are as described above.

The antistatic agent may be quaternary ammonium salt compounds: pyridinium salts; cationic compounds having 1 to 3 amino groups; anionic compounds such as a sulfonic acid base, a sulfuric ester base, a phosphoric ester base, a phosphonic acid base, and the like; amphoteric compounds such as amino acid-based or aminosulfuric acid ester-based compounds; nonionic compounds such as imino alcohol-based compounds, glycerin-based compounds, polyethylene glycol-based compounds, and the like; organometallic compounds such as metal alkoxide compounds including tin, titanium, or the like; metal chelate compounds such as an acetylacetonate salt of the organometallic compounds; two or more reactants or polymers of these compounds; and a mixture of two or more of these compounds. Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used. The conductive polymer may include aromatic conjugated poly(paraphenylene), heterocyclic conjugated polypyrrole, polythiophene, aliphatic conjugated polyacetylene, conjugated polyaniline containing a hetero atom, mixed-type conjugated poly(phenylenevinylene), conjugated double-chain type conjugated compound having a plurality of conjugated chains in the molecule, a conductive complex obtained by graft or block copolymerization of a conjugated polymer chain with a saturated polymer, and the like. Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film including a binder resin (5) of the photocurable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyltriethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer.

However, since the metal alkoxide-based compound can rapidly react with water, the sol-gel reaction can be performed by a method of diluting the metal alkoxide-based compound in an organic solvent and then slowly dripping water thereto. At this time, considering the reaction efficiency or the like, the molar ratio (based on metal ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

On the other hand, the hard coating film may be formed from a photocurable coating composition including the photocurable resin or the photocurable compound, an antistatic agent, and a photopolymerization initiator.

As the photopolymerization initiator, any compound known to be usable in a photocurable resin composition may be used without particular limitation. Specifically, a benzophenone-based compound, an acetophenone-based based compound, a non-imidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound. If the amount of the photopolymerization initiator is too small, the photopolymerization initiator is uncured in the photocuring step of the photocurable coating composition to generate a residual material. If the amount of the photopolymerization initiator is too large, the unreacted initiator may remain as impurities or the crosslinking density may be lowered, and thus the mechanical properties of the resulting film may be deteriorated, or the reflectivity may be greatly increased.

The photocurable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran or propylene glycol monomethyl ether; or a mixture of two or more thereof.

The organic solvent may be added at the time of mixing the respective components contained in the photocurable coating composition, or may be added to the photocurable coating composition while the respective components are added in a state of being dispersed or mixed in the organic solvent. If the content of the organic solvent in the photocurable coating composition is too small, the flowability of the photocurable coating composition may be reduced, resulting in defects such as generation of stripes in the finally produced film, or the like. Further, if the organic solvent is added in an excessive amount, the solid content is lowered, and the physical properties and surface properties of the film may be deteriorated due to insufficient coating and film formation, and defects may occur during the drying and curing processes. Accordingly, the photocurable coating composition may include an organic solvent such that the concentration of the total solids of the components contained is 1% by weight to 55% by weight, or 30% by weight to 45% by weight.

The photocurable coating composition may further include additives. Examples of such additives include a wetting agent for lowering the surface tension of the coating solution of the photocurable coating composition and thus improving the wetting property on the substrate (2), a leveling agent for improving the surface leveling property and thus ensuring uniform thickness and coating properties, and the like.

On the other hand, together with the above-mentioned hard coating layer (3), an antireflection film (1) including a low refractive index layer (4) prepared using a photocurable coating composition containing a photocurable compound, at least two fluorine-containing compounds containing a photoreactive functional group, inorganic fine particles, and a photoinitiator can improve the abrasion resistance or scratch resistance while further lowering the reflectivity and increasing the light transmittance, and at the same time secure an excellent antifouling property against the external contaminants.

Specifically, as the photocurable coating composition contains two or more types of fluorine-containing compounds containing photoreactive functional groups, the finally produced low refractive index layer (4) may have lower reflectivity and improved light transmittance, and secure a high antifouling property against external contamination while improving the mechanical properties such as scratch resistance.

Specifically, due to the characteristics of the fluorine element contained in the fluorine-containing compound containing the photoreactive functional group, the low refractive index layer (4) produced from the photocurable coating composition allows the interaction energy to lower with respect to liquids or organic substances, whereby not only the amount of contaminants transferred to the low refractive layer can be greatly reduced but also the phenomenon where the transferred contaminants remain on the surface can be prevented, and the contaminants themselves can be easily removed.

In addition, in the process of forming the low refractive index layer (4), the reactive functional groups included in the fluorine-containing compound containing the photoreactive functional group perform a crosslinking action, thereby increasing the physical durability, scratch resistance, and thermal stability that the low refractive index layer has.

Particularly, by using two or more types of fluorine-containing compounds containing a photoreactive functional group, a higher synergistic effect can be obtained as compared with the case of using one kind of fluorine-containing compound containing a photoreactive functional group, and specifically, the low refractive index layer produced as described above can realize surface properties such as improved antifouling property and slip property while securing higher physical durability and scratch resistance.

Specifically, the low refractive index layer (4) includes a binder resin (5) including a crosslinked (co)polymer between a photopolymerizable compound and two or more types of fluorine-containing compounds containing a photoreactive functional group, and inorganic fine particles dispersed in the binder resin.

The two or more types of fluorine-containing compounds including the photoreactive functional group may be classified according to the contained fluorine content ranges. Specifically, the two or more types of fluorine-containing compounds containing the photoreactive functional group have different fluorine content ranges depending on the types.

Due to the characteristics attributed to the fluorine-containing compound exhibiting a higher fluorine content among the two or more types of fluorine-containing compounds containing the photoreactive functional group, the low refractive index layer and the antireflection film (1) produced from the photocurable coating composition can have a more improved antifouling property while securing lower reflectivity. Further, the fluorine-containing compound exhibiting a lower fluorine content among the two or more types of fluorine-containing compounds containing the photoreactive functional group can further improve compatibility with other components contained in the photocurable coating composition, and further, the finally produced low reflective index layer (4) and antireflection film (1) have higher physical durability and scratch resistance, and have homogeneous surface characteristics and a high surface slip property together with an improved antifouling property.

More specifically, the two or more types of fluorine-containing compounds containing the photoreactive functional group may be classified based on 25% by weight of the content of fluorine contained therein. The content of fluorine contained in each fluorine-containing compound containing the photoreactive functional group can be confirmed by a commonly known analytical method, for example, an IC (on Chromatograph) analysis method.

As a specific example, the two or more types of fluorine-containing compounds containing the photoreactive functional group may include a first fluorine-containing compound containing a photoreactive functional group and containing 25% to 60% by weight of fluorine.

Further, the two or more types of fluorine-containing compounds containing the photoreactive functional group may include a second fluorine-containing compound containing a photoreactive functional group and containing 1% to 25% by weight of fluorine.

As the photocurable coating composition includes 1) a first fluorine-containing compound containing a photoreactive functional group and containing 25% to 60% by weight of fluorine, and 2) a second fluorine-containing compound containing a photoreactive functional group and containing 1% by weight or more and less than 25% of fluorine, it is possible to realize surface characteristics such as an enhanced antifouling property and slip property while securing higher physical durability and scratch resistance, as compared to the case of using one type of fluorine-containing compound containing the photoreactive functional group.

Specifically, due to the first fluorine-containing compound having a higher fluorine content, the finally produced low refractive index layer (4) and antirefection film (1) can have a more improved antifouling property while ensuring lower reflectivity, and due to the second fluorine-containing compound having a lower fluorine content, they can further increase the compatibility with other components contained in the photocurable coating composition. In addition, the finally produced low refractive index layer (4) and antireflection film (1) can have higher physical durability and scratch resistance and have a homogeneous surface property and a high surface slip property together with improved antifouling properties.

The difference in fluorine content between the first fluorine-containing compound and the second fluorine-containing compound may be 5% by weight or more. As the difference in fluorine content between the first fluorine-containing compound and the second fluorine-containing compound is 5% by weight or more, or 10% by weight or more, the effect due to each of the first fluorine-containing compound and the second fluorine-containing compound can be further maximized, whereby the synergistic effect of using the first fluorine-containing compound and the second fluorine-containing compound together may be increased.

The terms "first" and "second" are used for specifying the components to be referred to, and accordingly, the order or importance is not limited.

The weight ratio between the first fluorine-containing compound and the second fluorine-containing compound is not particularly limited, but in order to allow the finally produced low refractive index layer to have homogeneous surface characteristics together with improved scratch resistance and antifouling property, the weight ratio between the first fluorine-containing compound and the second fluorine-containing compound may be 0.01 to 0.5, preferably 0.01 to 0.4.

One or more photoreactive functional groups may be contained or substituted in each of the two or more types of fluorine-containing compounds containing the photoreactive functional group. The photoreactive functional group means a functional group capable of participating in the polymerization reaction by irradiation with light, for example, by irradiation with visible light or ultraviolet light. The photoreactive functional group may include various functional groups known to be capable of participating in the polymerization reaction by irradiation with light. Specific examples thereof include a (meth)acrylate group, an epoxide group, a vinyl group, or a thiol group.

Each of the two or more types of fluorine-containing compounds containing the photoreactive functional group may be an oligomer or (co)polymer having a weight average molecular weight (weight average molecular weight in terms of polystyrene measured by a GPC method) of 2000 to 200,000, preferably 5000 to 100,000.

Each of the two or more types of fluorine-containing compounds containing the photoreactive functional group or any one or more of them may be a fluorine-containing monomer having two or more reactive functional groups in one molecule.

In order to further lower the refractive index of the low refractive index layer, a fluorine-containing monomer having two or more reactive functional groups in one molecule may be included.

As the fluorine-containing monomer has two or more reactive functional groups in one molecule, the coating film strength of the low refractive index layer (4) can be increased, and as fluorine is contained, the optical characteristics such as refractive index of the low refractive index layer can be adjusted. Examples of the fluorine-containing monomer having two or more reactive functional groups in one molecule include a fluorine-containing monomer having a pentaerythritol skeleton, a fluorine-containing monomer having a dipentaerythritol skeleton, a fluorine-containing monomer having a trimethylolpropane skeleton, a fluorine-containing monomer having a cyclohexyl skeleton, a fluorine-containing monomer having a linear skeleton, and the like.

If the weight average molecular weight of the fluorine-containing compound containing the photoreactive functional group is too small, the fluorine-containing compounds in the photocurable coating composition cannot be uniformly and effectively arranged on the surface and are located inside the low refractive index layer that is finally produced. Thus, the antifouling property that the surface of the low refractive index has is lowered and the crosslinking density of the low refractive index layer is lowered, so that the mechanical properties such as the overall strength and the scratch resistance may be deteriorated.

In addition, if the weight average molecular weight of the fluorine-containing compound containing the photoreactive functional group is too high, the compatibility with other components in the photocurable coating composition may be lowered, and thus the haze of the low refractive index layer (4) that is finally produced or the light transmittance may be lowered, and the strength of the low refractive index layer may also be lowered.

Specifically, the fluorine-containing compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; or iv) a polyether compound in which at least one photoreactive functional group is substituted and at least one hydrogen is substituted with fluorine, or a mixture of two or more of i) to iv) or copolymers thereof.

The photocurable coating composition may contain 20 to 300 parts by weight of at least two fluorine-containing compounds containing the photoreactive functional group based on 100 parts by weight of the photopolymerizable compound. The content of the at least two fluorine-containing compounds containing the photoreactive functional group relative to the photopolymerizable compound is based on the total content of the at least two fluorine-containing compounds containing the photoreactive functional group.

When the fluorine-containing compound containing the photoreactive functional group is excessively added as compared with the photopolymerizable compound, the coating property of the photocurable coating composition of the embodiment may be lowered, or the low refractive index layer obtained from the photocurable coating composition of the embodiment may not have sufficient durability or scratch resistance. When the amount of the fluorine-containing compound containing the photoreactive functional group is too small as compared with the photopolymerizable compound, the low refractive index layer obtained from the photocurable coating composition of the embodiment may not have mechanical properties such as sufficient antifouling property and scratch resistance.

The fluorine-containing compound containing the photoreactive functional group may further contain silicon or a silicon compound. That is, the fluorine-containing compound containing a photoreactive functional group can optionally contain silicon or a silicon compound therein. Specifically, the content of silicon in the fluorine-containing compound containing the photoreactive functional group may be 0.1% by weight to 20% by weight.

The content of the silicon or silicon compound contained in each of the fluorine-containing compounds containing the photoreactive functional group can also be confirmed by a commonly known analysis method, for example, an ICP (Inductively Coupled Plasma) analysis method.

The silicon contained in the fluorine-containing compounds containing the photoreactive functional group can increase the compatibility with other components contained in the photocurable coating composition of the embodiment, whereby it can prevent the generation of haze on the finally produced refractive layer and serve to enhance transparency, and further improve the slip property on the surface of the finally produced low refractive index layer (4) or antireflection film (1), thereby increasing scratch resistance.

On the other hand, if the content of silicon in the fluorine-containing compounds containing the photoreactive functional group is too large, compatibility between the other components contained in the photocurable coating composition of the embodiment and the fluorine-containing compound may be rather lowered, whereby the finally produced low refractive index layer (4) and antireflection film (1) may not have sufficient transparency and antireflection performance, and thus the antifouling property of the surface may also be lowered.

Meanwhile, the photocurable coating composition may further include a polysilsesquioxane in which at least one reactive functional group is substituted. The polysilsesquioxane in which at least one reactive functional group is substituted may be a compound in which a reactive functional group is present on the surface, thereby increasing the mechanical properties such as scratch resistance of a coating film or a binder resin formed upon photocuring of the photocurable coating composition.

As the photocurable coating composition for forming the low refractive index layer (4) further includes a polysilsesquioxane in which at least one reactive functional group is substituted, the binder resin (5) contained in the low refractive index layer may further include a crosslinked (co) polymer between a photopolymerizable compound and two or more types of fluorine-containing compounds containing photoreactive functional groups, and a polysilsesquioxane in which at least one reactive functional group is substituted.

When the previously known fine particles such as silica, alumina, zeolite, etc. are used, the strength of the film or coating film is simply increased, whereas when a polysilsesquioxane in which at least one reactive functional group is substituted is used, not only the strength of the finally produced low refractive index layer (4) or antireflection film (1) is increased but also a crosslinking bond can be formed over the entire film area, thereby improving both the surface strength and the scratch resistance.

The photocurable coating composition may include 0.5 to 60 parts by weight or 1.5 to 45 parts by weight of a polysilsesquioxane in which at least one reactive functional group is substituted, based on 100 parts by weight of the photopolymerizable compound.

When the content of the polysilsesquioxane having at least one reactive functional group substituted therein relative to the photopolymerizable compound in the photocurable coating composition is too small, it may be difficult to sufficiently ensure the scratch resistance of the coating film or the binder resin formed at the time of photocuring the photocurable coating composition. When the content of the polysilsesquioxane having at least one reactive functional group substituted therein relative to the photopolymerizable compound in the photocurable coating composition is too large, the transparency of the finally produced low refractive index layer (4) or antireflection film (1) can be decreased, and the scratch resistance can be rather decreased.

The reactive functional group substituted in the polysilsesquioxane may include at least one selected from the group consisting of alcohol, amine, carboxylic acid, epoxide, imide, (meth)acrylate, nitrile, norbomene, olefin [ally, cycloalkenyl, vinyldimethylsilyl, etc.], polyethylene glycol, thiol, and vinyl, and may preferably be epoxide or (meth)acrylate.

More specific examples of the reactive functional group include (meth)acrylates, alkyl (meth)acrylates having 1 to 20 carbon atoms, alkyl cycloalkyl epoxide having 3 to 20 carbon atoms, and cycloalkane epoxide having 1 to 10 carbon atoms.

The alkyl (meth)acrylate means that the other part of "alkyl" that is not bonded to (meth)acrylate is a bonding position, the cycloalkyl epoxide means that the other part of "cycloalkyl" that is not bonded to an epoxide is a bonding position, and the alkyl cycloalkane epoxide means that the other part of "alkyl" that is not bonded to a cycloalkane epoxide is a bonding position.

On the other hand, the polysilsesquioxane in which at least one reactive functional group is substituted may further include at least one unreactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the above-described reactive functional group. Thus, as the reactive functional groups and the unreactive functional groups are surface-substituted in the polysilsesquioxane, the siloxane bond (—Si—O—) in the polysilsesquioxane in which at least one reactive functional group is substituted is located inside the molecule and is not exposed to the outside, so that the compatibility with other organic materials can be enhanced, and the siloxane bond is firmly formed between the reactive functional group and other organic materials, thereby not being separated by the external pressure. Further, it can serve as a rigid support in the coating film or the binder resin formed during the photocuring of the photocurable coating composition. Therefore, the strength and scratch resistance of the finally produced low reflective index layer and antireflection film (1) can be greatly increased.

On the other hand, the polysilsesquioxane may be represented by $(RSiO_{1.5})_n$ (where n is 4 to 30 or 8 to 20), and may have various structures such as random, ladder type, cage, partial cage, etc.

However, in order to enhance the physical properties and quality of the low refractive index layer (4) and antireflection film (1) produced from the photocurable coating composition, a polyhedral oligomeric silsesquioxane having a cage structure, in which at least one reactive functional group is substituted, may be used as the polysilsesquioxane in which at least one reactive group is substituted.

Further, more preferably, the polyhedral oligomeric silsesquioxane having a cage structure in which at least one reactive functional group is substituted may include 8 to 20 silicon atoms in a molecule.

In addition, a least one or all silicon atoms of the polyhedral oligomeric silsesquioxane having a cage structure may be substituted with a reactive functional group, and the silicon atoms in which no reactive functional groups are substituted may be substituted with the unreactive functional groups described above.

As at least one silicon atom of the polysilsesquioxane having a cage structure is substituted with a reactive functional group, the mechanical properties of the coating film or the binder resin formed upon photocuring of the photocurable coating composition may be enhanced. Further, as the remaining silicon atoms are substituted with unreactive functional groups, molecular structural steric hindrance appears, which significantly decreases the frequency or probability of exposure of the siloxane bond (—Si—O—) to the outside, and thus the compatibility with other organic materials can be enhanced, and the siloxane bond is firmly formed between the reactive functional group and other organic materials, thereby not being separated by the external pressure. Further, it can serve as a rigid support in the coating film or the binder resin formed during the photocuring of the photocurable coating composition. Therefore, the strength and scratch resistance of the finally produced low refractive index layer (4) or antireflection film (1) can be greatly increased.

Examples of the polyhedral oligomeric silsesquioxane (POSS) having a cage structure in which at least one reactive functional group is substituted include POSS in which at least one alcohol is substituted, such as TMP diolisobutyl POSS, cyclohexanediol isobutyl POSS, 1,2-propanediol-sobutyl POSS, octa(3-hydroxy-3 methylbutyldimethylsiloxy) POSS, etc.; POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS in which at least one carboxylic acid is substituted, such as maleamic acid-cyclohexyl POSS, maleamic acid-isobutyl POSS, octa maleamic acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; POSS in which at least one imide is substituted, such as POSS maleimide cyclohexyl, POSS maleimide isobutyl, etc.; POSS in which at least one (meth)acrytate is substituted, such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acryllsooctyl POSS, (meth)acrylphenyl POSS, (meth)acryl POSS, acrylo POSS, etc.; POSS in which at least one nitrile group is substituted, such as cyanopropylisobutyl POSS, etc.; POSS in which at least one norbomene group is substituted, such as norbomenylethylethyl POSS, norbomenylethylisobutyl POSS, norbomenylethyl disilanoisobutyl POSS, trisnorbomenyl isobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyidimethylsilyl POSS, octavinyldimethylsilyl POSS, octavinyl POSS, etc.; POSS in which a PEG having 5 to 30 carbon atoms is substituted; or POSS in which at least one thiol group is substituted, such as mercaptopropylisobutyl POSS, mercaptopropylisooctyl POSS, etc.

Meanwhile, the photopolymerizable compound contained in the photocurable coating composition of the embodiment may form a binder resin (5) of the low refractive index layer (4) to be produced. Specifically, the photopolymerizable compound may include a monomer or an oligomer containing a (meth)acrylate or vinyl group. Specifically, the photopolymerizable compound may include a monomer or an oligomer containing one or more, or two or more, or three or more of (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta (meth)acrylate, dipentaerythritol hexa(meth)acrylate, tipentaerythritol hepta(meth)acrylate, trilene diisocyanate, xylene diisocyanate, hexamethylene diisocyanate, trimethylolpropane tri(meth)acrylate, trimethylolpropane polyethoxy tri (meth)acrylate, trimethylolpropane trimethacrylate, ethylene glycol dimethacrylate, butanediol dimethacrylate, hexaethyl methacrylate, butyl methacylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers is preferably 1000 to 10,000.

Specific examples of the monomer or oligomer containing a vinyl group include divinylbenzene, styrene, or paramethyl styrene.

The content of the photopolymerizable compound in the photocurable coating composition is not particularly limited. However, considering the mechanical properties of the finally produced low refractive index layer (4) and antireflection film (1), the content of the photopolymerizable compound in the solid content of the photocurable coating composition may be 10% by weight to 80% by weight. The solid content of the photocurable coating composition refers only to the solid components, excluding the liquid components in the photocurable coating composition, for example, organic solvents, which may be optionally included as described below.

On the other hand, the photopolymerizable compound may further include a fluorine-based (meth)acrylate-based compound in addition to the monomer or oligomer described above. When the fluorine-based (meth)acrylate-based compound is further included, the weight ratio of the fluorine-based (meth)acrylate-based compound to the monomer or oligomer containing a (meth)acrylate or vinyl group may be 0.1% to 10%.

Specific examples of the fluorine-based (meth)acrylate-based compound include at least one compound selected from the group consisting of the following Chemical Formulae (11) to (15).

[Chemical Formula 11]

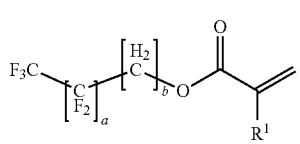

In the above Chemical Formula 11, $R^1$ is a hydrogen group or an alkyl group having 1 to 6 carbon atoms, a is an integer of 0 to 7, and b is an integer of 1 to 3.

[Chemical Formula 12]

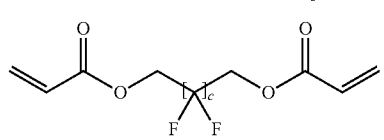

In the above Chemical Formula 12, c is an integer of 1 to 10.

[Chemical Formula 13]

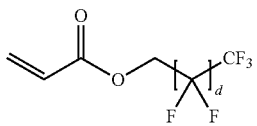

In the above Chemical Formula 13, d is an integer of 1 to 11.

[Chemical Formula 14]

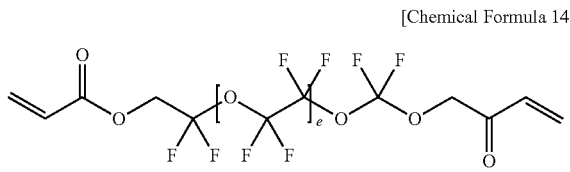

In the above Chemical Formula 14, e is an integer of 1 to 5.

[Chemical Formula 15]

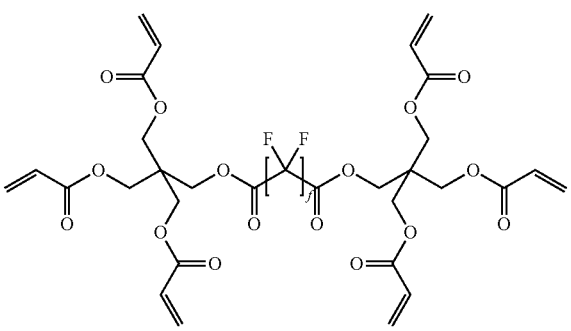

In the above Chemical Formula 15, f is an integer of 4 to 10.

On the other hand, the low refractive index layer (4) may include inorganic fine particles (6) dispersed in the binder resin (5). The inorganic fine particles (6) refer to inorganic particles having a diameter of nanometer or micrometer units.

Specifically, the inorganic fine particles may be hollow silica particles having a number average particle diameter of 10 to 100 nm, nanosilica particles having a number average particle diameter of 1 to 50 nm, or a mixture thereof.

The hollow silica particles refer to silica particles in which voids are present on the surface and/or inside of the particles. The hollow silica particles may have a lower refraction index than that of the particles filled therein and thus can exhibit excellent antireflection properties.

The hollow silica particles may have a number average particle diameter of 10 to 100 nm, preferably 20 to 70 nm, more preferably 30 to 70 nm, and the shape of the particles is preferably spherical, but it may be amorphous.

Further, as the hollow silica particles, hollow silica particles in which a surface is substituted with a photoreactive functional group, hollow silica particles in which a surface is coated with a fluorine-containing compound, or hollow silica particles in which a surface is not substituted or not coated may be used alone, or mixtures or reactants of two or more may be used. The photoreactive functional groups may include a (meth)acrylate group, a vinyl group, a hydroxyl group, an amine group, an allyl group, an epoxide group, a hydroxyl group, an isocyanate group, an amine group, and a thiol group.

The hollow silica particles may be contained in the composition as a colloidal phase dispersed in a predetermined dispersion medium. The colloidal phase including the hollow silica particles may include an organic solvent as a dispersion medium.

The solid content of the inorganic nanoparticles in the colloidal phase may be determined in consideration of the content range of the hollow silica particles in the photocurable coating composition of the embodiment and the viscosity of the photocurable coating composition, etc., and for example, the solid content of the hollow inorganic nanoparticles in the colloidal phase may be 5% by weight to 60% by weight.

Herein, examples of the organic solvent in the dispersion medium include alcohols such as methanol, isopropyl alcohol, ethylene glycol butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

Further, as the inorganic fine particles (6), nanosilica particles having a number average particle diameter of 1 to 50 nm, or 3 to 30 nm, may be used. The nanosilica particle mean a silica particle filled therein, unlike the hollow silica particles.

By using the nanosillca particles, the low refractive index layer prepared from the photocurable coating composition of the above embodiment can ensure higher mechanical strength and scratch resistance. In addition, as the nanosilica particles having a number average particle diameter of 1 to 50 nm or 3 to 30 nm are contained in a predetermined amount, phase separation of inorganic fine particles or the like may occur during the formation of the low refractive index layer, so that the reflectivity of the low refractive index layer can be further lowered.

The low refractive index layer (4) may contain 10 to 400 parts by weight or 20 to 200 parts by weight of the inorganic fine particles (6) based on 100 parts by weight of the photopolymerizable compound. When the inorganic fine particles (6) are added in an excessive amount, the inorganic fine particles are arranged on the surface of the finally produced low refractive index layer, and surface irregularities are excessively generated, so that the antifouling property may be lowered.

As the photopolymerization initiator, any compound known to be usable in a photocurable resin composition may be used without particular limitation. Specifically, a benzophenone-based compound, an acetophenone-based based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound. If the amount of the photopolymerization initiator is too small, the photopolymerization initiator is uncured in the photocuring step of the photocurable coating composition to generate a residual material. If the amount of the photopolymerization initiator is too large, the unreacted initiator may remain as impurities or the crosslinking density may be lowered, and thus the mechanical properties of the resulting film may be deteriorated, or the reflectivity may be greatly increased.

Meanwhile, the photocurable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran and propylene glycol monomethyl ether; or a mixture of two or more thereof.

The organic solvent may be added at the time of mixing the respective components contained in the photocurable coating composition, or may be added to the photocurable coating composition while the respective components are added in a state of being dispersed or mixed in the organic solvent. If the content of the organic solvent in the photocurable coating composition is too small, the flowability of the photocurable coating composition may be reduced, resulting in defects such as generation of stripes in the finally produced film, or the like. Further, if the organic solvent is added in an excessive amount, the solid content is lowered, and the physical properties and surface properties of the film may be deteriorated due to insufficient coating and film formation, and defects may occur during the drying and curing processes. Accordingly, the photocurable coating composition may include an organic solvent such that the concentration of the total solids of the components contained is 1% by weight to 50% by weight, or 2% by weight to 20% by weight.

The low refractive index layer (4) can be obtained by coating the photocurable coating composition onto a predetermined substrate (2) and photocuring the coated product. The specific kind and thickness of the substrate (2) are not particularly limited, and a substrate known to be usable in the production of a low refractive index layer (4) or an antireflection film (1) can be used without particular limitation.

The method and apparatus commonly used for coating the photocurable coating composition can be used without particular limitation. For example, a bar coating method, such as using a Meyer bar or the like, a gravure coating method, a 2-roll reverse coating method, a vacuum slot die coating method, a 2-roll coating method, or the like can be used.

The low refractive index layer (4) may have a thickness of 1 nm to 300 nm, or 50 nm to 200 nm. Accordingly, the thickness of the photocurable coating composition coated onto the predetermined substrate (2) can be about 1 nm to 300 nm, or 50 nm to 200 nm.

In the step of photocuring the photocurable coating composition, ultraviolet light or visible light having a wavelength of 200 nm to 400 nm can be irradiated, and the amount of exposure is preferably 5 mJ/a to 2000 mJ/cm$^2$. The exposure time is not particularly limited, and can be appropriately varied depending on the exposure apparatus used, the wavelength of the irradiated light, or the amount of light exposure.

Further, in the step of photocuring the photocurable coating composition, nitrogen purging or the like may be performed to apply a nitrogen atmosphere condition.

The low refractive index layer (4) may have average reflectivity of 2.0% or less, or 1.0% or less, or 0.7% or less.

Advantageous Effects

According to the present invention, an antireflection film capable of simultaneously implementing high scratch resistance and antifouling property while having low reflectivity and high light transmittance, and capable of reducing the reflection of external light through implementation of low reflectivity and thus enhancing the visibility of a display device, may be provided.

DETAILED DESCRIPTION OF THE EMBODIMENTS

Hereinafter, embodiments of the invention will be described in more detail by way of examples. However, these examples are given for illustrative purposes only, and the scope of the invention is not intended to be limited by these examples.

Preparation Example and Comparative Example: Preparation of Antireflection Film (1) Preparation of Hard Coating Film A salt-type antistatic hard coating solution manufactured by Toyo Ink Co. (50% by weight of solid content, product name: LJD-1000) was diluted with methyl isobutyl ketone to prepare a hard coating liquid having a solid content of 40% by weight. The diluted hard coating solution was coated onto a triacetyl cellulose film with a #10 Mayer bar, dried at 90° C. for 2 min, and then photocured under the conditions of the following Table 2 to obtain a hard coating film having a thickness of 10 μm, (1) Preparation of a Photocurable Coating Composition for Producing a Low Refractive Index Layer Components shown in the following Table 1 were mixed and diluted with MIBK (methyl isobutyl ketone) solvent so that the solid content became 3% by weight.

TABLE 1

|  | LR1 | LR2 | LR3 | LR4 | LR5 |
|---|---|---|---|---|---|
| THRULYA 4320 | 50 | 50 | 50 | 42 | 42 |
| X71-1203M | 15 |  |  |  |  |
| OPTOOL-AR110 |  | 15 | 15 | 18 | 18 |
| RS-537 | 3 | 3 | 3 | 5 | 5 |
| MA0701 |  |  | 4 |  | 5 |
| MIBK-ST | 10 | 10 | 10 | 15 | 13 |
| Dipentaerythritol pentaacrylate | 18 | 18 | 15 | 16 | 13 |
| Irgacure-127 | 4 | 4 | 3 | 4 | 4 |

(Unit: % by weight based on total solid content)

1) THRULYA 4320 (manufactured by Catalysts and Chemicals Ltd.): Hollow silica dispersion (solid content 20 wt % in MIBK solvent)

2) X71-1203M (manufactured by Shinetsu): Fluorine-containing compound containing a photoreactive functional group (diluted to a solid content 15 wt % in MIBK solvent, fluorine content of solids; about 45 wt %)

3) OPTOOL-AR 110 (manufactured by Daikin): a fluorine-containing compound having a photoreactive functional group (diluted to a solid content of 15 wt % in MIBK solvent, fluorine content of solids: about 51 wt %)

4) RS537 (manufactured by DIC): Fluorine-containing compound containing a photoreactive functional group (diluted to a solid content 40 wt % in MIBK solvent, fluorine content of solids: about 17% by weight)

5) MA0701: Polysilsesquioxane (manufactured by Hybrid Plastics)

6) MIBK-ST (manufactured by Nissan Chemical): diluted with a nanosilica dispersion to a solid content 30% in MIBK solvent (2) Preparation of Low Reflective Index Layer and Antireflection Film The photocurable coating compositions obtained in Table 1 above were coated with a #3 Mayer bar on the hard coating film shown in Table 2 below and dried at 60° C. for 1 min. The dried material was subjected to ultraviolet irradiation at a dose of 100 mJ/cm$^2$ under nitrogen purging to form a low refractive index layer having a thickness of 100 nm, thereby producing an antireflection film.

TABLE 2

|  | Hard coating layer | | | |
|---|---|---|---|---|
|  | Whether purged with nitrogen during photocuring | Moving speed of hard coating film during ultraviolet irradiation [m/min] | Ultraviolet intensity [mJ/cm$^2$] | Low reflective index |
| Example 1 | 0 | 47 | 20 | LR1 |
| Example 2 | 0 | 47 | 20 | LR2 |
| Example 3 | 0 | 47 | 20 | LR3 |
| Example 4 | 0 | 47 | 20 | LR4 |
| Example 5 | 0 | 47 | 20 | LR5 |
| Example 6 | 0 | 15 | 60 | LR4 |
| Comparative Example 1 | x | 4 | 445 | LR4 |
| Comparative Example 2 | x | 8 | 220 | LR4 |
| Comparative Example 3 | x | 4 | 445 | LR5 |
| Comparative Example 4 | x | 8 | 220 | LR5 |

Experimental Examples: Measurement of Physical Properties of Antireflection Films The following experiments were conducted for the antireflection films obtained in the examples and comparative examples.

1. Measurement of Surface Energy of Hard Coating Film

The surface energies of the hard coating layers of each of the examples and comparative examples were measured by determining a contact angle of DI water (Gebhardt) and diiodomethane (Owens) at 10 points using a contact angle measuring apparatus DSA-100 (Kruss), calculating the average value, and then converting the average contact angle into the surface energy. In the measurement of the surface energy, the contact angle was converted into the surface energy by using Dropshape Analysis software and applying the following General Formula 1 of the OWRK (Owen, Wendt, Rable, Kaeble) method to the program.

$$\gamma_L(1+\cos\theta)=2\sqrt{\gamma_S^D \gamma_L^D}+2\sqrt{\gamma_S^P \gamma_L^P} \qquad \text{[General Formula 1]}$$

2. Measurement of Center Line Average Roughness (Ra)

The center line average roughness of the hard coating layer of each of the examples and comparative examples was measured according to the measurement standard concerning surface roughness (Ra) of JIS standard (JIS B 0601-1982). Specifically, aluminum-coated silicon tips (Bruker Corp.) were used at a scan speed of 0.5 to 0.8 Hz with Multimode AFM (MultiMode 8) equipment (Bruker Corp.). The hard coating layer sample of each of the examples and comparative examples (length*width: 1 cm*1 cm) was fixed on the AFM sample disk with a carbon tape, the measurement was performed while observing a flat portion with an optical microscope, and 3-point measured values in the area of 5 μm*5 μm were averaged, thereby obtaining the center line average roughness (Ra).

3. Measurement of Antifouling Property

Three straight lines were drawn with a red permanent marker on the surface of the antireflection films obtained in the examples and comparative examples. Then, the antifouling property was evaluated through the number of erasing times when rubbing with a nonwoven cloth.

O: Erase when rubbing 5 times or less
Δ: Erase when rubbing 6 to 10 times
X: Erase or not erase when rubbing 11 times or more 4. Measurement of Scratch Resistance The surface of the antireflection films obtained in the examples and comparative examples was rubbed back and forth 10 times with steel wool (#0000) having a surface area of 20 mm*20 mm under a load at a speed of 10 cm/s. The scratch resistance was evaluated by confirming the maximum load at which a scratch of 1 cm or less was observed with the naked eye was 1 or less.

TABLE 2

|  | Surface energy of hard coating layer [N/m] | Center line average roughness (Ra) of the surface of the hard coating layer [nm] | Antifouling Property | Scratch resistance (g) |
| --- | --- | --- | --- | --- |
| Example 1 | 33 | 0.7 | O | 400 |
| Example 2 | 33 | 0.7 | O | 400 |
| Example 3 | 33 | 0.7 | O | 450 |
| Example 4 | 33 | 0.7 | O | 450 |
| Example 5 | 33 | 0.7 | O | 500 |
| Example 6 | 32.11 | 0.7 | O | 500 |
| Comparative Example 1 | 35.16 | 0.7 | Δ | 450 |
| Comparative Example 2 | 41.44 | 1.4 | X | 450 |
| Comparative Example 3 | 35.16 | 0.7 | Δ | 500 |
| Comparative Example 4 | 41.44 | 1.4 | X | 500 |

As shown in Table 2, it was confirmed that the antireflection film of the examples had relatively excellent scratch resistance and at the same time had excellent antifouling properties. On the contrary, it was confirmed that the antireflection films of the comparative examples exhibited relatively poor scratch resistance and did not ensure a sufficient antifouling property.

Specifically, it was confirmed that, in the antireflection films of the examples using the hard coating in which center line average roughness (Ra) of the surface was 1.2 nm or less and surface energy was 34 mN/m or less, high scratch resistance and antifouling property could be realized at the same time and also relatively low reflectance, for example, average reflectivity of 0.7% or less could be realized.

The invention claimed is:

1. An antireflection film comprising:
   a hard coating layer of which center line average roughness (Ra) of the surface is 1.2 nm or less and surface energy is 34 mN/m or less; and
   a low refractive index layer which is formed on the hard coating layer,
   wherein the low refractive index layer comprises a binder resin including a crosslinked (co)polymer between a photopolymerizable compound and two or more types of fluorine-containing compounds containing a photoreactive functional group, and inorganic fine particles dispersed in the binder resin,
   wherein the two or more types of fluorine-containing compounds containing the photoreactive functional group have different fluorine content ranges, and
   wherein the two or more types of fluorine-containing compounds containing the photoreactive functional group include a first fluorine-containing compound containing a photoreactive functional group and 25% to 60% by weight of fluorine.

2. The antireflection film of claim 1, wherein the surface of the hard coating layer has a center line average roughness (Ra) of from 0.5 nm to 0.8 nm.

3. The antireflection film of claim 1, wherein the hard coating layer has a surface energy of 30 mN/m to 33.5 mN/m.

4. The antireflection film of claim 1, wherein the hard coating layer comprises a binder resin containing a polymer of at least one photocurable compound selected from the group consisting of: (meth)acrylate monomers; monomers or oligomers of urethane-based meth)acrylate monomers, epoxy-based (meth)acrylate, and ester-based (meth)acrylate; and (meth)acrylate compounds having a heterocyclic skeleton or (meth)acrylates having an alicyclic ring, each of which has at least one ethylenically unsaturated bond.

5. The antireflection film of claim 1, wherein the hard coating film comprises a binder resin containing a photocurable resin and a high molecular weight (co)polymer having a weight average molecular weight of 10,000 or higher, and organic or inorganic fine particles dispersed in the binder resin.

6. The antireflection film of claim 1, wherein the hard coating layer comprises a binder resin containing a photocurable resin, and an antistatic agent dispersed in the binder resin.

7. The antireflection film of claim 6, wherein the hard coating layer further includes at least one compound selected from the group consisting of an alkoxysilane-based oligomer and a metal alkoxide-based oligomer.

8. The antireflection film of claim 1, wherein the two or more types of fluorine-containing compounds containing the photoreactive functional group include a second fluorine-containing compound containing a photoreactive functional group and 1% by weight or more and less than 25% by weight of fluorine.

9. The antireflection film of claim 8, wherein the difference in fluorine content between the first fluorine-containing compound and the second fluorine-containing compound is 5% by weight or more.

10. The antireflection film of claim 8, wherein the weight ratio between the first fluorine-containing compound and the second fluorine-containing compound is from 1:0.01 to 1:0.5.

11. The antireflection film of claim 1, wherein the fluorine-containing compound containing the photoreactive functional group is an oligomer or (co)polymer having a weight average molecular weight of from 2000 to 200,000, or a fluorine-containing monomer having two or more reactive functional groups in one molecule.

12. The antireflection film of claim 1, wherein the low reflective index layer contains 20 to 300 parts by weight, based on 100 parts by weight of the photopolymerizable compound, of the two or more types of fluorine-containing compounds containing the photoreactive functional group.

13. The antireflection film of claim 1, wherein the photoreactive functional group contained in the fluorine-containing compound is at least one compound selected from the group consisting of a (meth)acrylate group, an epoxide group, a vinyl group, and a thiol group.

14. The antireflection film of claim 1, wherein the binder resin contained in the low refractive index layer further includes a crosslinked (co)polymer between a photopolymerizable compound and two or more types of fluorine-containing compounds containing photoreactive functional groups, and a polysilsesquioxane wherein at least one reactive functional group is substituted.

15. The antireflection film of claim 14, wherein the low reflective layer includes from 0.5 to 60 parts by weight, based on 100 parts by weight of the photopolymerizable compound, of a polysilsesquioxane in which at least one reactive functional group is substituted.

16. The antireflection film of claim 1, wherein the inorganic fine particles includes hollow silica particles having a number average particle diameter of 10 nm to 100 nm and/or nanosilica particles having a number average particle diameter of 1 nm to 50 nm.

17. The antireflection film of claim 1, wherein the low refractive index layer contains 10 to 400 parts by weight based on 100 parts by weight of the photopolymerizable compound, of the inorganic fine particles.

\* \* \* \* \*